United States Patent
Marinho et al.

(10) Patent No.: US 6,738,637 B1
(45) Date of Patent: May 18, 2004

(54) DYNAMIC VARIATION OF CLASS OF SERVICE IN A COMMUNICATION NETWORK BASED ON NETWORK RESOURCES

(75) Inventors: John Antonio Marinho, Warren, NJ (US); Eshwar Pittampalli, Randolph, NJ (US); Daniel Charles Stanzione, Summit, NJ (US); George Isaac Zysman, Township of Mendham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/212,885

(22) Filed: Dec. 16, 1998

(51) Int. Cl.$^7$ .............................. H04B 7/00; H04Q 7/20
(52) U.S. Cl. ....................................... 455/512; 455/419
(58) Field of Search ................................. 455/432, 433, 455/435, 418, 419, 445, 512

(56) References Cited

U.S. PATENT DOCUMENTS

| | | | | |
|---|---|---|---|---|
| 5,615,249 A | * | 3/1997 | Solondz | 455/450 |
| 5,649,299 A | | 7/1997 | Battin et al. | 455/62 |
| 6,091,967 A | * | 7/2000 | Kruys | 455/557 |
| 6,201,971 B1 | * | 3/2001 | Purnadi | 455/450 |

FOREIGN PATENT DOCUMENTS

| | | | |
|---|---|---|---|
| GB | 2 311 439 | 9/1997 | H04L/12/56 |
| GB | 2 326 055 | 9/1998 | H04L/12/56 |

OTHER PUBLICATIONS

Suresh Singh, "Quality of service guarantees in mobile computing", *Computer communications, Elsevier, Science Publishers BV, Amsterdam, NL*, vol. 19, No. 4, (Apr. 1, 1996), pp. 359–371.
European Search Report.

* cited by examiner

*Primary Examiner*—Vivian Chang
*Assistant Examiner*—James Moore
(74) *Attorney, Agent, or Firm*—Christopher N. Malvone (57) ABSTRACT

A communication system monitors the resources that are available for new users. When the availability of free resources becomes too small or falls below a threshold, the communication system initiates a reduction in the the class of service to selected users. The class of service can be reduced by reducing the quality of service provided to existing communications or by providing selected new users with only lower quality communications. The decision to alter the class of service is alerted to the end user and based on the profile of the end user, appropriate alteration of a specific resource parameter is undertaken. The quality of communications may be reduced, for example, by decreasing the information carrying capacity of the channel available to a particular user and thereby decreasing the data transfer rate, decreasing the amount of error encoding used to detect and correct errors introduced by a communication channel, or in the case of a wireless system, using a lower rate vocoder (voice encoder) which win reduce the voice quality or clarity of the speech transmitted over the communication channel.

19 Claims, 8 Drawing Sheets

DATA 20

| CALLER ID | INITIAL CLASS 22 | DOWN GRADE 34 | RT to REFUSE 32 | PRIORITY 30 | CURRENT STATUS 36 | RATE OPTIONS 24 | CHAN. TYPE OPTIONS 26 | ERROR RATE OPTIONS 28 |
|---|---|---|---|---|---|---|---|---|
| 555-1212 | P | Y | N | HIGH | 3, D, 0.1% | 1-3 CHAN | DIGITAL, ANALOG | 0.1-0.5% |
| 555-1313 | M | Y | N | LOW | 2, D, 0.5% | 1-2 CHAN | DIGITAL, ANALOG | 0.1-0.9% |
| 555-1414 | E | N | Y | MED | 1, A, 1.0% | 1-2 CHAN | ANALOG ONLY | 0.1-1.0% |

40 → 555-1212 row, 42 → 555-1313 row, 44 → 555-1414 row

FIG. 2C 18

VIDEO

| CALLER ID | INITIAL CLASS | DOWN GRADE | RT to REFUSE | PRIORITY | CURRENT STATUS | ENCODE OPTIONS | RATE OPTIONS | CHAN TYPE OPTIONS | ERROR RATE OPTIONS |
|---|---|---|---|---|---|---|---|---|---|
| 555-1212 | P | Y | N | HIGH | MPEG2, 3, D, 0.1% | MPEG 2, MEPG 1 | 1-3 CHAN | DIGITAL ANALOG | 0.1-0.5% |
| 555-1313 | M | Y | N | LOW | MPEG2, 1, D, 0.5% | MPEG 2, MEPG 1 | 1-2 CHAN | DIGITAL ANALOG | 0.1-0.9% |
| 555-1414 | E | N | Y | MED | MPEG1, 1, A, 1.0% | MPEG 1 ONLY | 1-2 CHAN | ANALOG ONLY | 0.1-1.0% |

DYNAMIC VARIATION OF CLASS OF SERVICE IN A COMMUNICATION NETWORK BASED ON NETWORK RESOURCES

BACKGROUND OF THE INVENTION

1. Field of the Invention

The present invention relates to telecommunications; more particularly, to the reallocation of network resources.

2. Description of the Related Art

Communication systems have a finite number of resources. Those resources include, for example, equipment, fibers, conductors, signal processors, and radio frequency spectrum. The amount of available capacity in a communication network varies with the number of users. When a large number of users are utilizing the network, there may be insufficient network resources to support new users. Additionally, the amount of available capacity varies as equipment is taken offline for maintenance or repair. Presently, when there are insufficient resources to support new callers or users, the new user is refused service which results in user annoyance and dissatisfaction.

SUMMARY OF THE INVENTION

The present invention solves the aforementioned problems by varying the class of service to existing users. The class of service is varied by changing, for example, speech clarity, data transfer rate or error correction capability. Downgrading a class of service for existing users frees up communication network resources for new users. This avoids frustrating new users who are attempting to start new calls. Additionally, users on existing calls are not dissatisfied by a decrease in the class of service because they have previously agreed to accept downgrades and receive a price discount for the decreased service. It is also possible for users to refuse a downgrade in service in real-time. For example, while a call is in progress the user is given an opportunity to refuse the communication system's request to downgrade the call's class of service. Callers who have this right of refusal receive a more modest price discount than users who unconditionally accept service downgrades.

The communication system monitors the resources that are available for new users. When the availability of resources becomes too small or falls below a predetermined threshold, the communication system initiates a reduction in the the class of service to selected users. The class of service can be reduced by reducing the quality of service provided to existing communications or by providing the new users with only lower quality communications. The quality of communications may be reduced, for example, by decreasing the number of channels made available to a particular user and thereby decreasing the data transfer rate, decreasing the amount of error encoding used to detect and correct errors introduced by a communication channel, or in the case of a wireless system, using a lower rate vocoder (voice encoder) which will reduce the voice quality or clarity of the speech transmitted over the communication channel.

DETAILED DESCRIPTION OF THE INVENTION

Figure 1A:
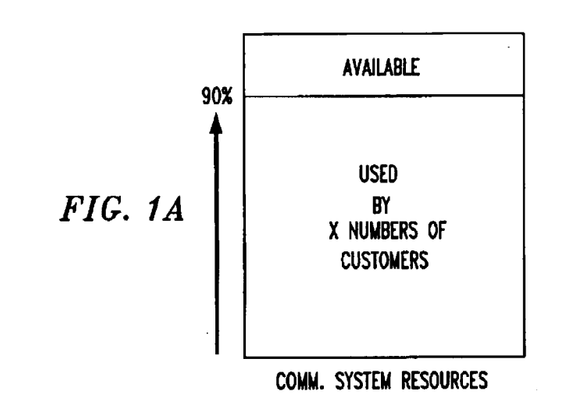
FIGS. 1A and 1B illustrate available communication systems resources.
Figure 1B:
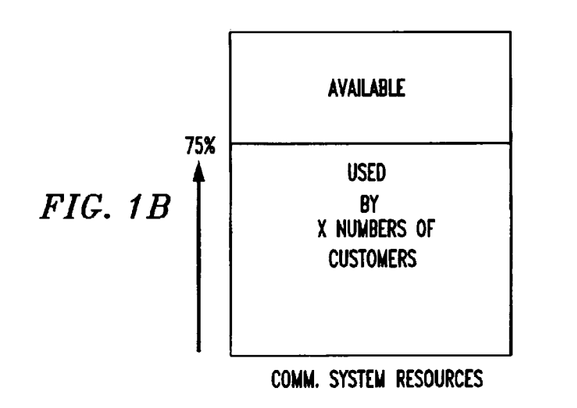

FIGS. 1A and 1B illustrate the available resources in a communication system. FIG. 1A illustrates a situation where 90 percent of the communication system or network resources are being utilized by X users. This leaves only 10 percent of the system's resources available for new calls or service requests. In this situation, the communication system may quickly become overloaded and will be unable to serve new users.

FIG. 1B illustrates the situation where the class of service provided to at least some of the X number of users has been decreased. As a result of downgrading the class of service, additional system resources have been made available for new users. In this example, the amount of system resources used by current calls has been decreased from 90 to 75 percent and thereby provides 25 percent of the communication system resources for new users. It should be noted that by downgrading the class or quality of service provided to some of the users, additional resources have been made available for other users. As a result, new users will not be frustrated by being unable to receive services, and the users who have received a decrease in service quality will be compensated by receiving a lower charge for their communication services.

Figure 2A:
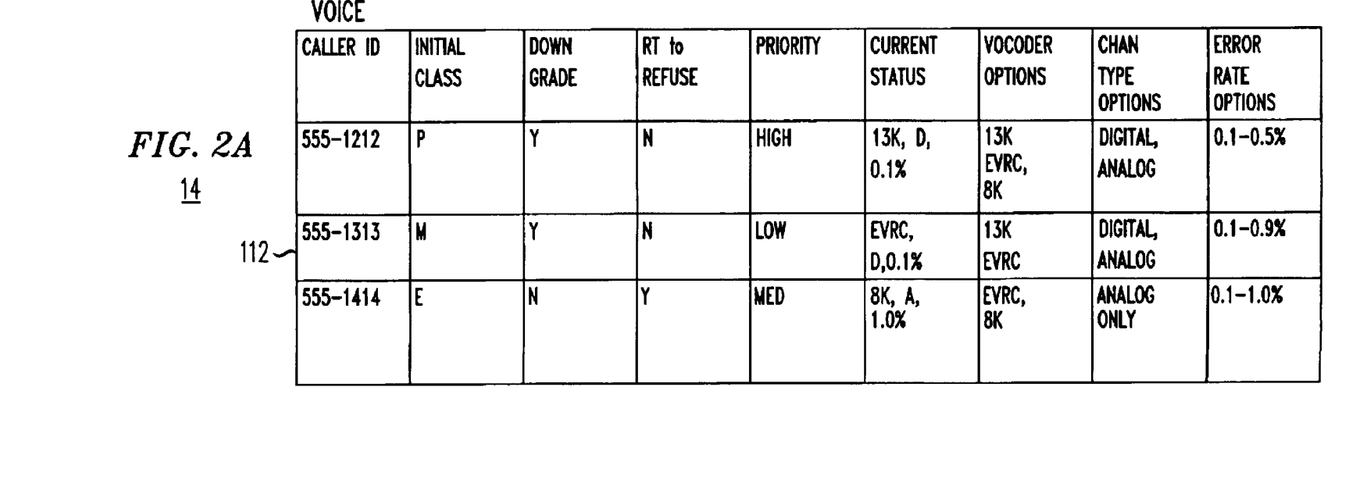
FIGS. 2A, 2B and 2C illustrate the contents of a database used to identify a user for a change in service class.
Figure 2B:
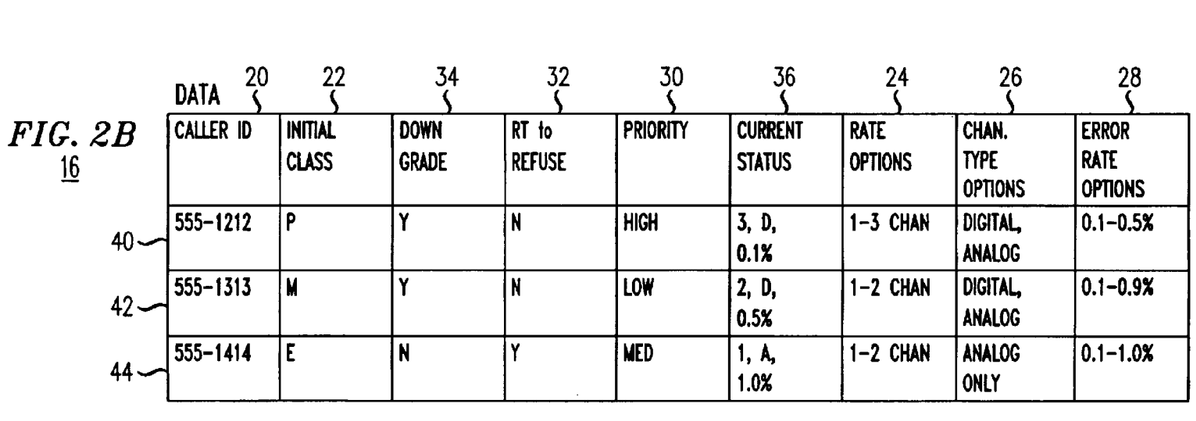
Figure 2C:
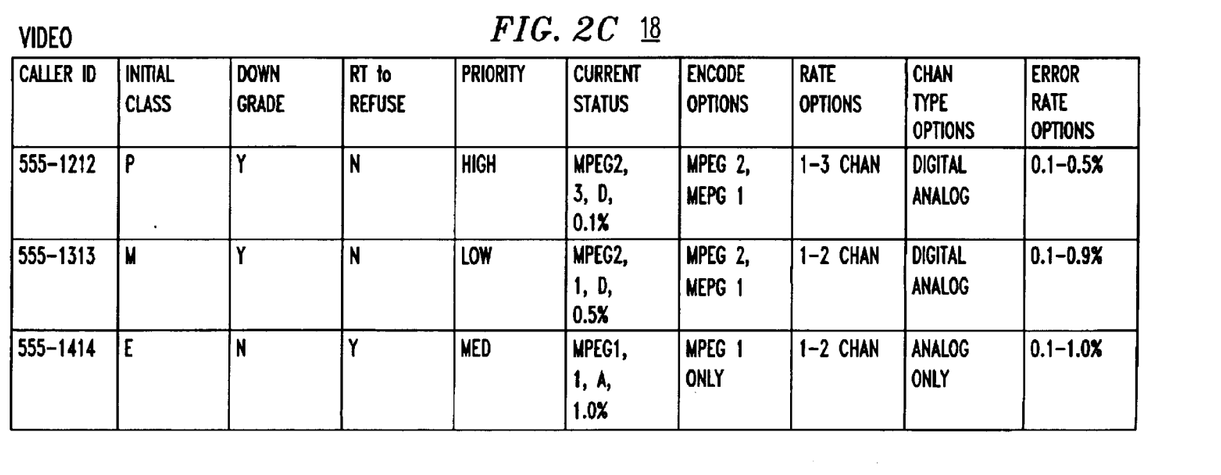

FIGS. 2A, 2B and 2C illustrate several entries in a database that are used to select users who may receive a downgrade or decrease in service class. It should be noted that separate tables or databases may be used for different types of communications. In this example, table 14 is used for voice communications, table 16 is used for data and table 18 is used for video. In reference to table 16, column 20 is used for Caller ID. The Caller ID may simply be a user's telephone or terminal number or another identifier. Column 22 contains entries for each user which indicates the initial class of service that a user receives when starting a call (assuming sufficient system resources are available). If the resources are available, the user is given the best option in each of the communication characteristics in columns 24, 26, and 28. Users with a higher initial class of service have more desirable options associated with one or more communication characteristics. There can be any number of classes, but for simplicity, we will only discuss three classes in this example. Premium class refers to the best class of service where, for example, a user is given a high data transfer rate over the communication network and a low error rate. The high rate of transmission may be provided, for example, by using multiple communication channels in parallel. The low error rate is provided by using more sophisticated error encoding techniques where extra bits of information are sent so that errors can be detected and corrected. Standard class service is of lower quality when compared to premium class. Standard class, for example, provides the user with a lower transmission rate and/or a higher error rate than premium class. Economy class service, which is the lowest class in this example, provides the user with the lowest transmission rate and/or the highest error rate.

In reference to table 16, columns 24, 26, and 28 list options or arrangements of options for different service characteristics. Column 24 lists data transfer rate options in terms of the number of channels that are provided to a user for communications. The larger number of channels; the higher the data transfer rate. Column 26 lists the channel type options as analog or digital where digital typically provides better performance. Column 28 indicates error rate options as ranges of error rates. Column 30 illustrates a user's priority level. The user with the highest priority level will be the last to receive a decrease in service class and users with the lowest priorities will be the first to receive a decrease in service class. Additionally, user's with the highest priority level will be the first to receive a class of service upgrade when additional system resources become available. Column 32 indicates whether a user has the right to refuse a decrease in service class. Callers who have a right to refuse a decrease in service class may be charged extra for that right and/or each time they exercise that right. Column 34 indicates whether a user is ever willing to take a downgrade. Column 36 indicates the current status of the user. This column indicates which option for each of the possible communication characteristics are being provided to a particular user. Knowing the current status of the users helps to prevent providing multiple downgrades to a single user without downgrading other users who have not received their first downgrade.

Rows 40, 42 and 44 of table 16 indicate the status and options available for three different users. The user associated with row 40 is a premium class customer as indicated by column 22, and is willing to take downgrades but does not have a right to refuse as indicated by columns 34 and 32, respectively. This user has the highest priority and therefore is in the last group to receive a downgrade and the first to receive an upgrade. Current status is listed in column 36, which indicates that the user now has access to three channels, all of which are digital, and has an error rate of 0.1%. Column 24 indicates that the user is willing to accept a downgrade from three channels to only one or two channels. Column 26 indicates that the user is wiling to take a downgrade from a digital to an analog channel, and column 28 indicates the user is willing to accept a downgrade in error rates from 0.1% to a maximum error rate of 0.5%. Rows 42 and 44 similarly indicate the type of service options that are available for other users and the current status of those users.

Tables 14 and 18 indicate the types of downgrades that are available for voice and video communications, respectively. They are similar to the tables associated with data calls except that different communication service characteristics are changed when downgrading or upgrading the class of service. With regard to voice and in reference to table 14, channel types and error rates may be modified as described with regard to data communications; however, voice communications are also provided with vocoder options. Vocoders are used to encode speech for wireless communication. 13K vocoders provide the clearest speech while EVRC (enhanced variable rate coders) and 4K vocoders provide less clear speech while the 4K vocoder is the least clear. Table 18 illustrates communication channel characteristics that may be modified to vary the class of service for video communications. As discussed earlier, rate options, channel type options, and error rate options may be varied, but in the case of video, encoding options may also be varied. For example, encoding options may include choosing between MPEG1 and MPEG2 encoding (MPEG 1 and MPEG 2 are standard video encoding techniques), where MPEG2 provides superior performance.

It should be noted that the downgrades that are carried out in accordance with the database illustrated by FIG. 2 may be carried out dynamically, that is, during a call, or they may be carried out at the beginning of a call. Additionally, other call types, communication characteristics and options may be used to produce the tables of FIGS. 2A, 2B and 2C.

Figure 3:
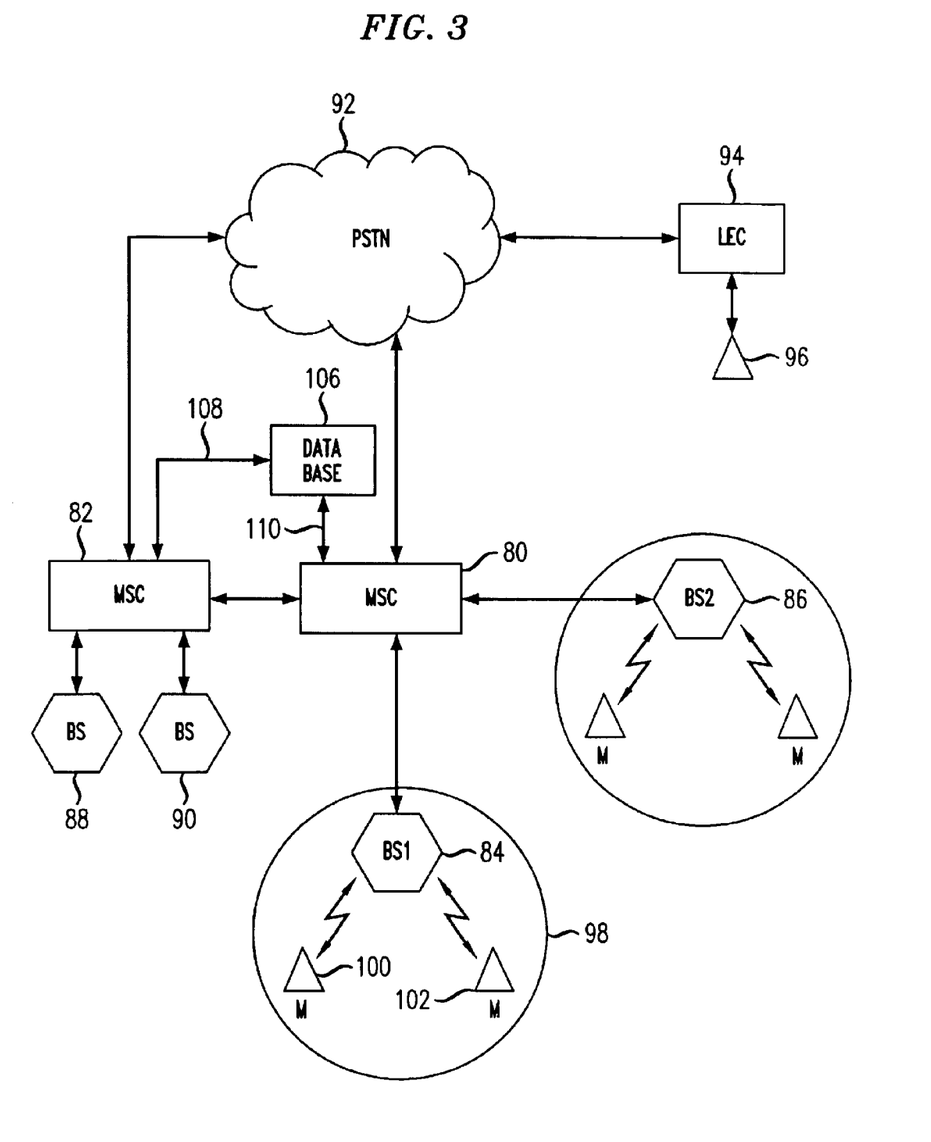
FIG. 3 is a block diagram of a wireless communication system.

FIG. 3 illustrates a typical wireless telecommunication system. The system consists of mobile switching centers (MSC) 80 and MSC 82. MSC 80 serves base stations 84 and 86. MSC 82 serves base stations 88 and 90. The MSCs communicate with the public switched telephone network (PSTN) 92. PSTN 92 then provides a communication link to, for example, a local exchange carrier (LEC) 94 which then provides communication to an end terminal 96. Each base station provides wireless communications within a geographic area surrounding the base station. In this example, assume that base station 84 provides telecommunication services within circle 98. As a result, base station 84 provides telecommunication services to mobile stations 100 and 102 and any other mobile stations that may be within circle 98.

Each of mobile switching centers 82 and 80 is in communication with database 106. Database 106 contains the information discussed with regard to FIGS. 2A, 2B and 2C. Mobile switching center 82 communicates with database 106 over communication link 108 and mobile switching center 80 communicates with database 106 over communication link 110. Communication links 108 and 110 may be direct links or may be through a PSTN or other type of network such as a data network or an ATM (asynchronous transfer mode) network. When one of the base stations or mobile switching centers detects a shortage in network resources, database 106 is accessed to determine which calls may be downgraded, what downgrades are available, and the current status of the users.

Figure 4:
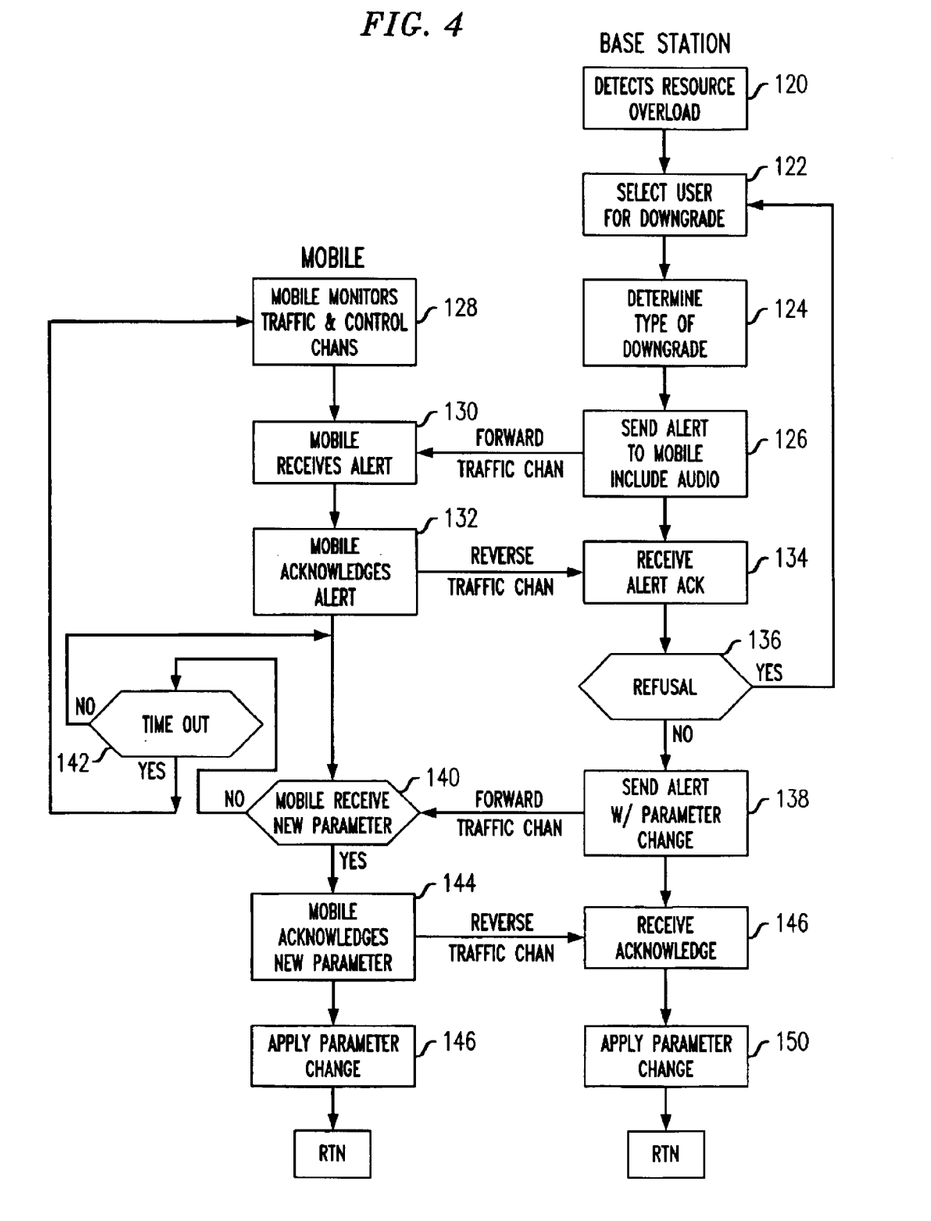
FIG. 4 illustrates a protocol or messaging sequence for dynamically varying the class of service provided to a user.

In the example that will be discussed in reference to FIG. 4, it is assumed that there are a large number of mobile stations within circle 98 of FIG. 3 so that resources of base station 84 are ninety percent utilized. As a result, it is necessary to decrease the class of service to one or more users within circle 98. FIG. 4 illustrates the communication protocol or exchange of messages between base station 84 and the mobile station that will have its class of service downgraded. In step 120, base station 84 detects a potential system or resource overload. It then executes step 122 where it accesses database 106 to identify or select a user for downgrading. The user is selected based on the communication characteristic that will help alleviate the network resource overload, and on the user with the lowest priority that has not already been downgraded. Another option for downgrade may be based on home versus visitor/roamer status. In this example, the user of row 112 of FIG. 2A has the lowest priority and will be downgraded first. In step 124 the type of downgrade is determined, that is, the new downgraded parameter associated with the communication characteristic of interest. This is done once again in accordance with the database illustrated in FIG. 2A. In step 126 base station 84 sends an alert message to the mobile which may include an audio, vibrating or visual alert. The audio, vibrating or visual alert is used to inform the user that a downgrade in service is pending. This alert is passed over a forward channel such as a forward traffic channel, but may also be passed over a control channel. Now turning to the mobile station, in step 128 the mobile monitors its traffic and/or control channel for alert messages. In step 130 the mobile receives the alert message that was transmitted over the forward channel by base station 84 in step 126. In step 132 the mobile acknowledges receipt of the alert by transmitting an acknowledgement over a reverse channel such as a reverse traffic channel or a control channel to base station 84 which receives the alert acknowledgement in step 134. The acknowledge message from the mobile station may include a refusal to accept the downgrade. (It is also possible to include an acceptance of the downgrade; however, the absence of a refusal may be treated as an implicit acceptance.) The refusal may be selected by the user in response to the alert, for example, by pressing any key or uttering a command. Once the alert acknowledge is received by base station 84, the base station determines whether a refusal has been received in the acknowledge message. If a refusal has been received, the database illustrated in FIG. 2A is checked to determine whether the mobile has a right of refusal. If in step 136 it is determined that a refusal was received and that the mobile has a right of refusal, the base station returns to step 122 to identify another user for downgrading. If a refusal is not received or if the right of refusal is not included in the database, the base station executes step 138 where it sends an alert with new parameters to the mobile. The new parameters indicate how the quality of service will be decreased. The parameters may indicate, for example, that one or more active communication channels will be dropped, that a different vocoder may be used, or that the amount of error encoding may be decreased. This message is sent to the mobile over a forward channel or over a control channel. Returning to the mobile, in step 140, the mobile determines if the new parameters from base station 84 have been received. If the new parameters have not been received, step 142 is executed. In step 142, the mobile determines if a time out has occurred. If a time out occurs (e.g., after 1 second), the mobile returns to step 128 where it monitors communication channels for new alerts or control information. If a message with new parameters is detected in step 140, step 144 is executed. In step 144 the mobile acknowledges receipt of the new parameters by sending an acknowledgement message to base station 84 over a reverse channel or control channel. The base station receives the acknowledgement in step 146. The mobile and the base station apply the new parameters, and thereby change the class of service in steps 148 and 150, respectively. After changing the parameters, the mobile and base station return to normal operations. In the case of the mobile that involves monitoring the traffic and control channels while providing communications for the user. In the case of the base station, the base station continues to provide communication for the mobile and monitors the use of system resources for possible downgrades of other users or additional downgrades of users that have received initial downgrades.

When more system resources become available, it is also possible to use the same process to upgrade a user's service to a higher class.

Figure 5:
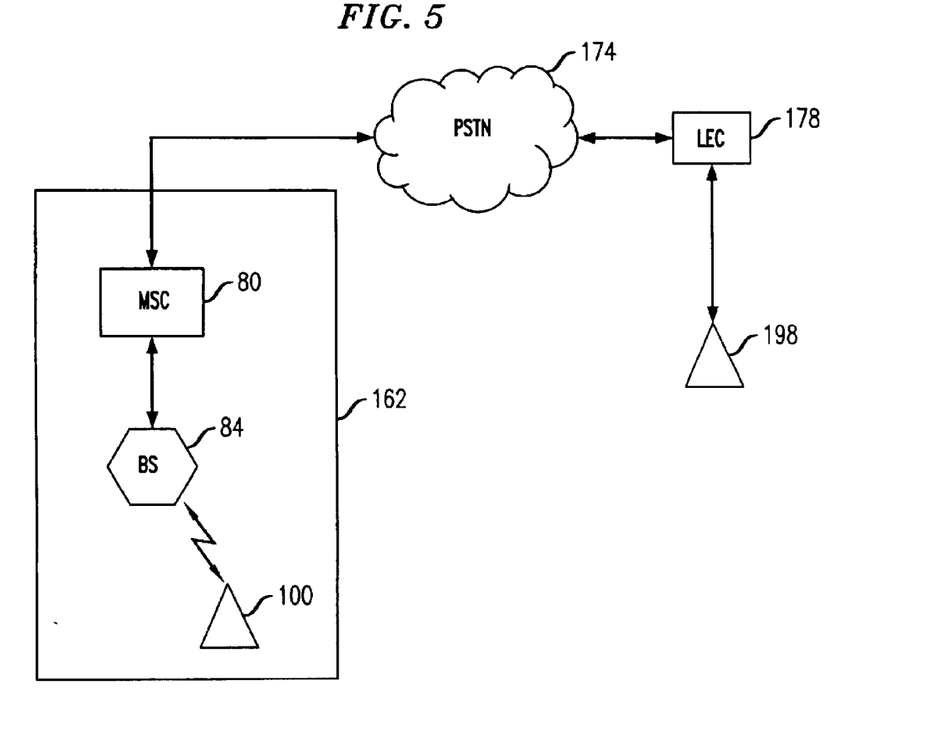
FIG. 5 illustrates a communication path passing through several different networks.

Providing communication services to a user typically involves the utilization of more than a single network. As a result, it is useful to coordinate downgrades in service across several networks by combining databases from several networks and providing all of the networks with access to the database. For example and in reference to FIG. 5, mobile terminal 100 may use wireless network 162 for a portion of the communication path, but the remaining portion of the path passes 179 through PSTN 174 and LEC 178 before reaching destination terminal 198. Database 160 is accessible to wireless network 162, PSTN 174 and LEC 178. Additionally, database 160 may include multiple databases such as database 106. If wireless network 162 downgrades a user's class of service, it would be indicated in database 160 showing the current status of the call as downgraded. If PSTN 174 also had a shortage of resources and needed to downgrade users, PSTN 174 would access database 160 and see that the user using wireless network 162 has already been downgraded and therefore should not be downgraded again by PSTN 174. As a result, PSTN 174 would select another user for downgrading and thereby more fairly distribute decreases in the class of service provided to the users.

Figure 6:
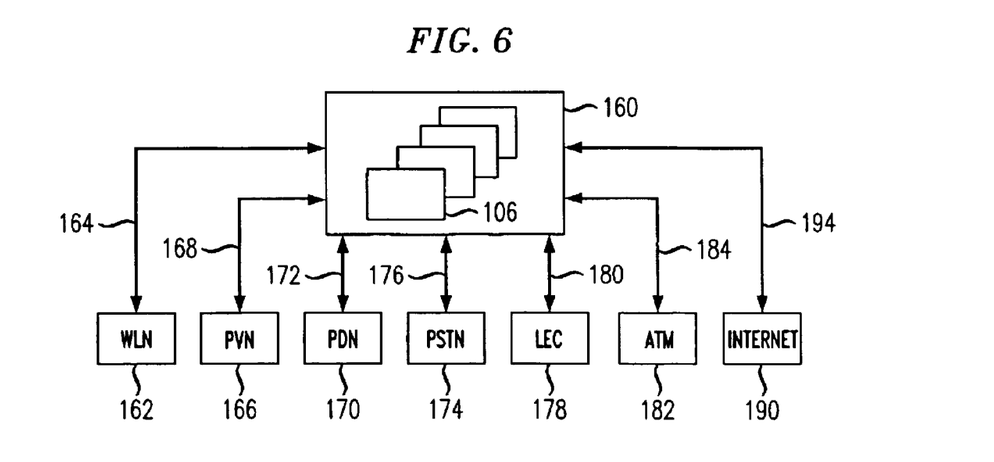
FIG. 6 illustrates several networks with access to a common variable class of service database(s)

FIG. 6 illustrates several different networks sharing database 160 in order to coordinate downgrades of service that may be provided by one or more of the networks. Wireless network (WLN) 162 communicates with database 160 via link 164. Private voice network (PVN) 166 uses communication link 168 to access database 160. Private data network (PDN) 170 uses communication link 172 to access database 160. Public switch telephone network (PSTN) 174 accesses database 160 via communication link 176. LEC 178 communicates with database 160 via link 180. Asynchronous Transfer Mode (ATM) network 182 uses communication link 184 to access database 160. Internet network 190 communicates with database 160 via link 194. The link between each network and database 160 may be a direct communication link or it may include a communication path through one or more of the other networks.

Figure 7:
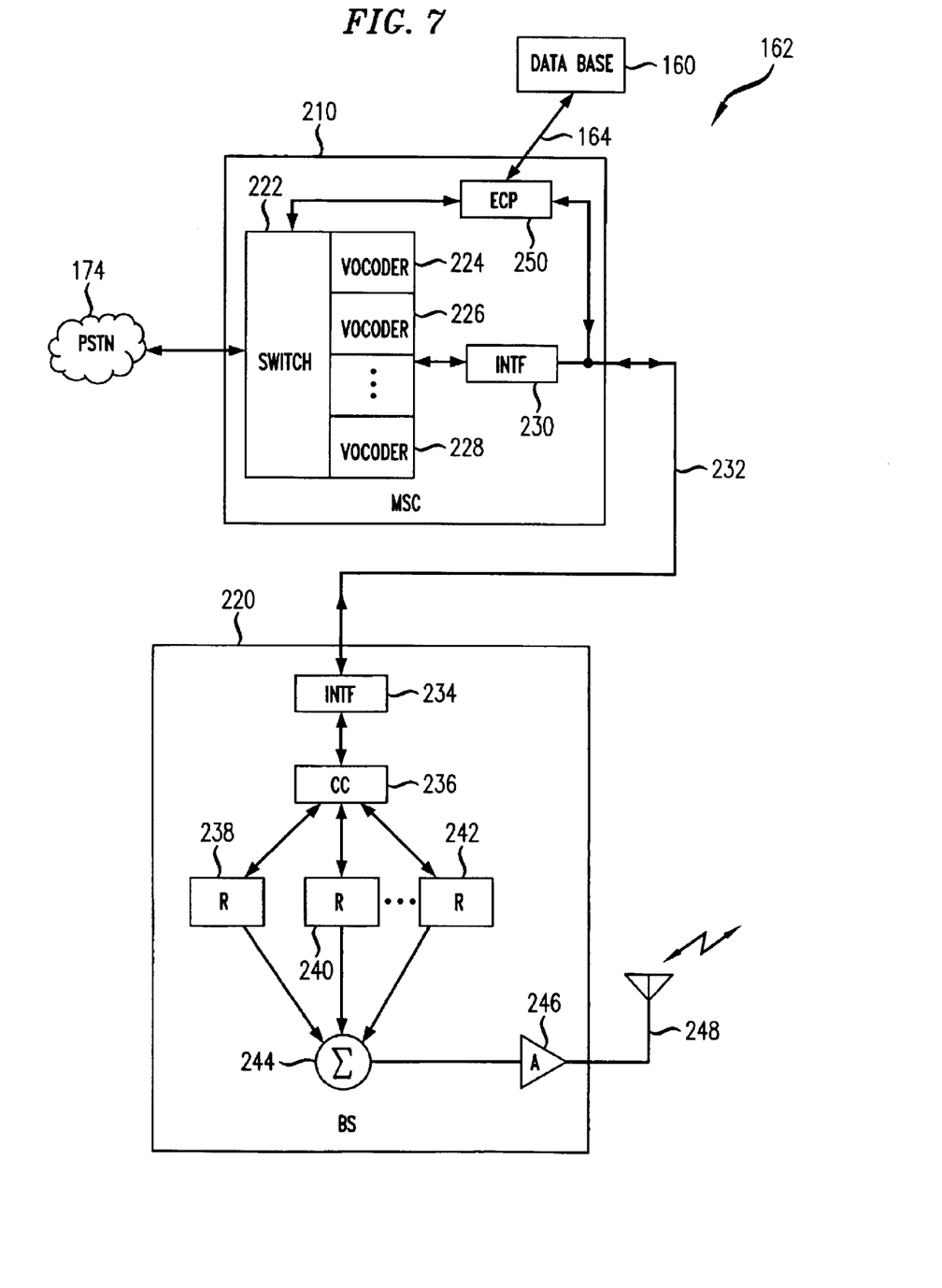
FIG. 7 illustrates a portion of a wireless network.

FIG. 7 illustrates a portion of wireless network 162. The wireless network monitors resource availability and, when necessary, accesses database 160 over link 164 to select a user for downgrading. Wireless network 162 includes mobile switching center 210 and base station 220. Mobile switching center (MSC) 210 communicates with PSTN 174 to send and receive calls. Calls to and from PSTN 174 are handled by switch 222 which routes the calls to one of vocoders 224, 226 and 228. The outputs of the vocoder are then transferred to interface unit 230 which transmits the calls over communication link 232 to interface 234 of base station 220. The calls from interface unit 234 are passed to channel controller (CC) 236 which sends the call to one of radios 238,240 and 242. The outputs of the radios are summed in summer 244 and amplified by amplifier 246 and transmitted to a mobile user over antenna 248. Mobility Management Processor (MMP) 250 located in MSC 210 monitors resource availability for the mobile switching center and the base station. It is also possible to locate MMP 250 in a separate location that monitors several mobile switching centers and their associated base stations. MMP 250 monitors, for example, the availability of vocoders to switch 222. Some of the vocoders may be higher rate vocoders that offer superior speech quality and other vocoders may be lower rate vocoders that do not offer a high level of speech quality. When MMP 250 detects a lack of available higher rate vocoders, it will access database 160 to select a user to be downgraded to a lower rate vocoder thereby making a higher rate vocoder available for higher priority users. It should be noted that the bank of vocoders associated with switch 222 may be located in base station 220 as an alternative to locating them in mobile switching center 210. MMP 250 also monitors the availability of radios in base station 220 via link 232. If the availability of radios associated with a digital channel is below a threshold and thereby makes it difficult to provide digital communication channels to high priority callers, MMP 250 accesses database 160 to select a user to be downgraded to an analog channel using an analog radio and thereby makes a digital radio available for a higher priority user.

Figure 8:
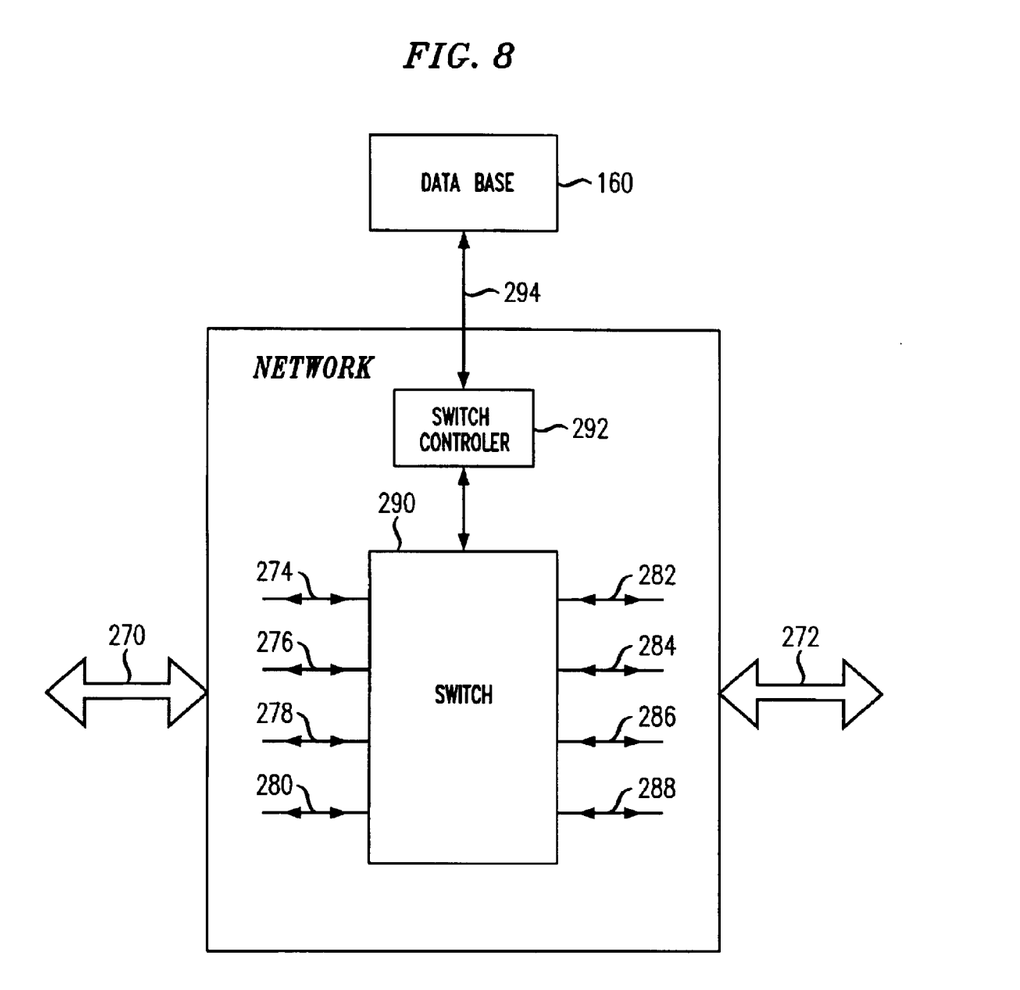
FIG. 8 illustrates a portion of a communication network.

FIG. 8 illustrates a portion of a communication network. The communication network receives and sends calls through ports 270 and 272. The incoming and outgoing communications typically occur over a set of physical channels 274, 276, 278 and 280 and at least one other set of physical channels such as channels 282,284,286 and 288. Switch 290 is used to provide connectivity between physical channels 274 through 280, and physical channels 282 through 288. It should be noted that each of the physical channels may contain a large number of virtual channels that are placed in time slots transmitted on each of the physical channels. This type of switch may be used in a network such as a PSTN, a data network or an ATM network. Switch controller 292 monitors the availability of channels and the number of channels being provided to a particular user. If the number of spare channels falls below a threshold, controller 292 accesses database 160 via link 294 to select a user that will be downgraded by having the number of channels provided to that user reduced. By reducing the number of channels to one or more selected users, additional channels are made available for new users or higher priority users.

Figure 9:
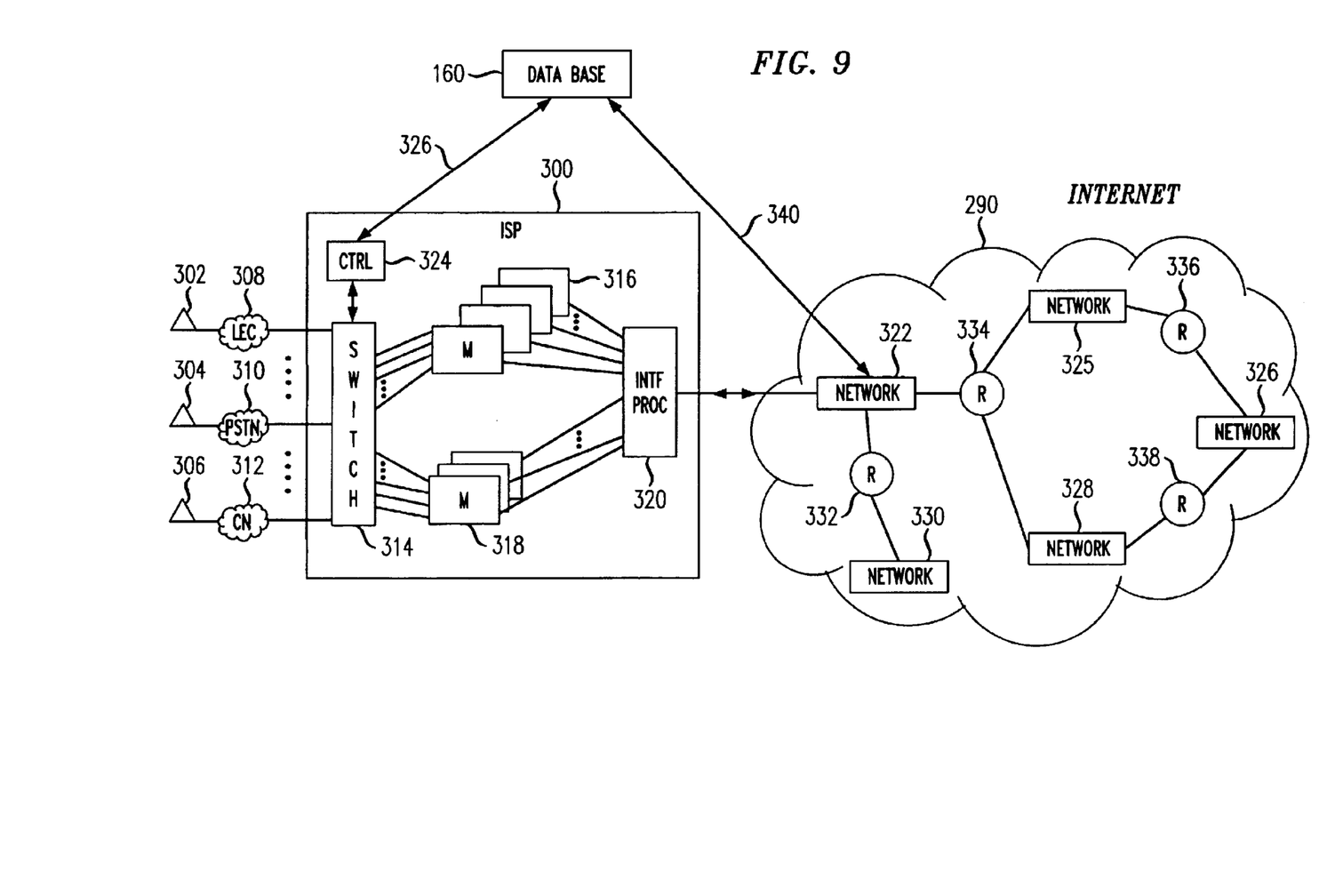
FIG. 9 illustrates a portion of the internet and an internet service provider.

FIG. 9 illustrates a portion of internet 190 and internet service provider (ISP) 300. ISP 300 communicates with users 302,304 and 306 over LEC 308, PSTN 310 and cable network (CN) 312, respectively. The users typically communicate using modems. The signals from the users' modems are received by switch 314 which provides connections to banks of modems 316 and 318. The outputs from the modems are processed by interface processor 320 so that the signals are formatted according to an agreed upon protocol between ISP 300 and network 322. Controller 324 monitors the function of switch 314 and the availability of a modem in banks 316 and 318. If controller 324 detects that the number of high speed modems has fallen below a threshold, controller 324 will access database 160 over link 326 to select a user for downgrading. The user will be downgraded by being switched from a higher speed modem to a lower speed modem. This will make additional high speed modems available for higher priority users.

Interface processor 320 provides the communications from ISP 300 to internet 190 via network 322. Network 322 communicates with other networks within the internet such as networks 325, 326, 328 and 330 via routers such as routers 332, 334, 336 and 338. Each of the networks also monitors the availability of its resources, for example, as was discussed with regard to FIG. 8. When one or more of the networks detect a lack of available resources, the network accesses database 160 to select a user for service downgrading. Each network may directly access database 160 over a link such as link 340, or a network may communicate with database 160 through other networks and routers that provide access to a direct link to database 160.

The invention claimed is:

1. identifies the uniquely distinct feature "using a received user response to the alert to determine whether the user has refused the change in communications service; and modifying at least one characteristic of the communication service provided to the user to change the availability of the communications system resource, if the user has not refused the change."

2. The method of claim 1, wherein the step of determining comprises providing the user with an audio alert.

3. The method of claim 1, wherein the step of determining comprises providing the user with a visual alert.

4. The method of claim 1, wherein the step of determining comprises providing the user with a vibrating alert.

5. The method of claim 1, wherein the step of determining comprises receiving a communication from the user refusing the change.

6. The method of claim 1, wherein the step of determining comprises receiving a communication from the user accepting the change.

7. The method of claim 1, further comprising the step of selecting another user if the user has refused the change.

8. The method of claim 1, where the step of selecting comprises determining a priority of the user.

9. The method of claim 1, where the step of selecting comprises determining a status of the user.

10. The method of claim 1, where the step of modifying comprises modifying an error rate provided to the user.

11. The method of claim 1, where the step of modifying comprises modifying a vocoder type provided to the user.

12. The method of claim 1, where the step of modifying comprises modifying an encoding provided to the user.

13. The method of claim 1, where the step of modifying comprises modifying a bandwidth provided to the user.

14. The method of claim 13, where the step of modifying comprises modifying a number of communication channels provided to the user.

15. The method of claim 1, where the step of selecting comprises selecting a new user.

16. The method of claim 1, where the step of selecting comprises selecting an existing user.

17. The method of claim 1, where the step of modifying comprises improving the communication service provided to the user.

18. The method of claim 1, where the step of modifying comprises downgrading the communication service provided to the user.

19. The method of claim 1, where the step of selecting comprises communicating with a database containing user information.

\* \* \* \* \*

UNITED STATES PATENT AND TRADEMARK OFFICE
CERTIFICATE OF CORRECTION

PATENT NO. : 6,738,637 B1
DATED : May 18, 2004
INVENTOR(S) : John Antonio Marinho et al.

It is certified that error appears in the above-identified patent and that said Letters Patent is hereby corrected as shown below:

Column 8,
Line 4, Claim 1, should read as follows:

-- 1. A method for varying communication service, comprising the steps of:

monitoring an availability of at least one communication system resource;

selecting a user currently participating in a call to receive a change in communication service provided to the user;

communicating an alert to the user that the user has been selected for the change in communication service;

using a received user response to the alert to determine whether the user has refused the change in communications service; and modifying at least one characteristic of the communication service provided to the user to change the availability of the communications system resource, if the user has not refused the change. --.

Signed and Sealed this

Fifteenth Day of February, 2005

JON W. DUDAS
*Director of the United States Patent and Trademark Office*